Figure 1:
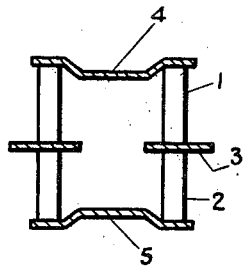

April 2, 1957

R. L. BREADNER ET AL 2,787,510

MANUFACTURE OF ELECTRICAL DEVICES HAVING
GAS-FILLED SEALED ENVELOPES

Filed Nov. 16, 1953

4 Sheets-Sheet 1

INVENTORS
ROBERT LEONARD BREADNER
TREVOR ROSS NEILL
CHARLES HENRY SIMMS

BY
ATTORNEY

April 2, 1957 R. L. BREADNER ET AL 2,787,510
MANUFACTURE OF ELECTRICAL DEVICES HAVING
GAS-FILLED SEALED ENVELOPES
Filed Nov. 16, 1953 4 Sheets-Sheet 3
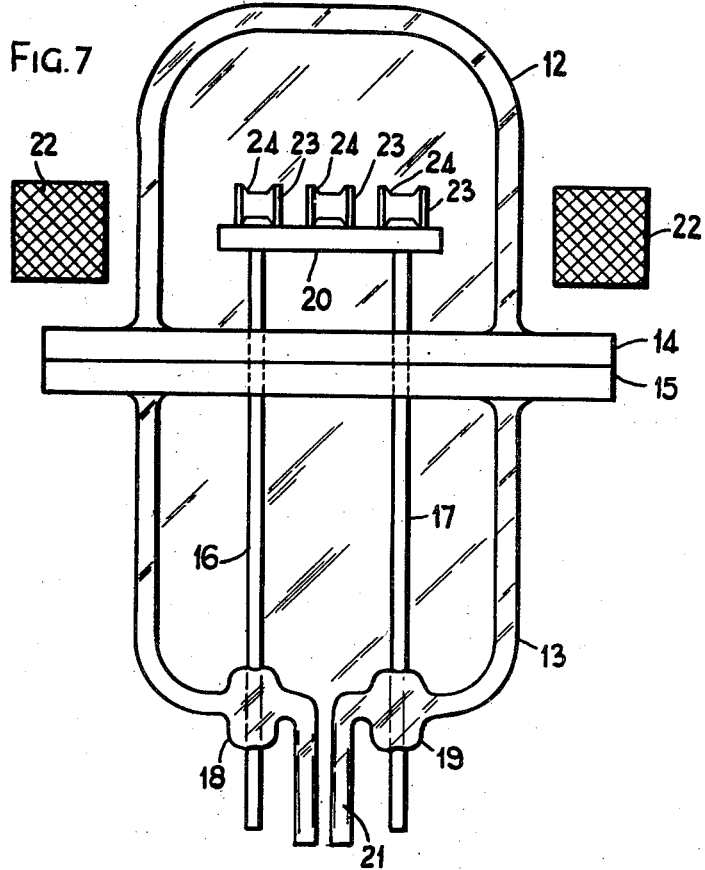
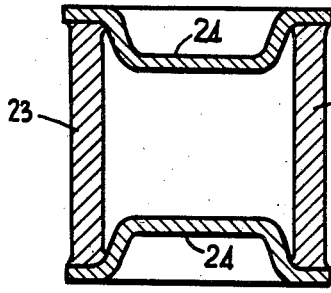
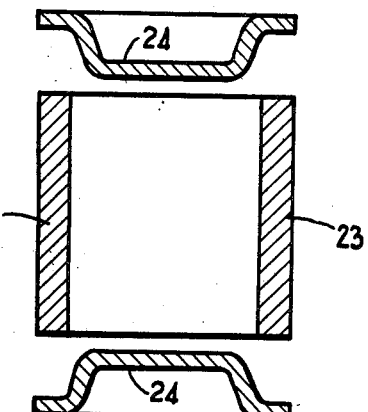
INVENTORS
ROBERT LEONARD BREADNER
TREVOR ROSS NEILL
CHARLES HENRY SIMMS
BY
ATTORNEY April 2, 1957 R. L. BREADNER ET AL 2,787,510
MANUFACTURE OF ELECTRICAL DEVICES HAVING
GAS-FILLED SEALED ENVELOPES
Filed Nov. 16, 1953 4 Sheets-Sheet 4

INVENTORS
ROBERT LEONARD BREADNER
TREVOR ROSS NEILL
CHARLES HENRY SIMMS

BY
ATTORNEY

United States Patent Office 2,787,510
Patented Apr. 2, 1957

2,787,510

MANUFACTURE OF ELECTRICAL DEVICES HAVING GAS-FILLED SEALED ENVELOPES

Robert Leonard Breadner, Kenton, Trevor Ross Neill, Wembley, and Charles Henry Simms, Twickenham, England, assignors to The General Electric Company Limited, London, England Application November 16, 1953, Serial No. 392,402

Claims priority, application Great Britain March 1, 1951

7 Claims. (Cl. 316—19)

This invention relates to, and to the manufacture of, electrical devices of the kind having a sealed envelope whose interior is filled with gas to a required pressure and which envelope comprises both metal and glass parts sealed together, and the present application is a continuation-in-part of our earlier application No. 273,476, filed on February 26, 1952. The invention is more particularly concerned with the manufacture of relatively small devices of this kind, such as miniature electric lamps, T-R cells, voltage breakdown devices and the like, and is especially directed to the manufacture of voltage breakdown devices, that is to say to devices which have a high impedance at relatively low voltages but which are arranged to break down so as to have a low impedance at relatively high voltages. The invention relates also to electric circuit arrangements comprising such devices for protecting apparatus against voltage surges, for example for diverting to earth voltage surges produced by lightning.

More particularly, though not exclusively, the invention is concerned with voltage breakdown devices suitable for use in apparatus operating at relatively low voltages, such as, for example, public telephone equipment, or apparatus operating on public supply mains at about 240 volts or less. The voltage breakdown devices used hitherto for this purpose have usually consisted of solid material, for example two blocks of conducting or semiconducting material separated by an insulating layer, which layer is disrupted on the occurrence of excess voltage, such as that due to a high voltage surge; such devices have the disadvantage, however, that they are in general able to operate once only and after operating have to be replaced by a fresh device, which is wasteful of materials and time in servicing.

To overcome this difficulty there have been used electric discharge devices containing a pair of electrodes within a gas-filled envelope and constructed so that no discharge takes place between the electrodes at the relatively low voltage but at the relatively high voltage the gas filling is ionised and a discharge takes place between the electrodes, the impedance of the device then falling to a very low value; when the high voltage ceases the discharge stops and the gas filling is de-ionised, the device reverting to its initial condition in readiness for further operation when required. Such discharge devices have, however, hitherto been much more expensive to manufacture than the solid type of device, and have been inconveniently fragile or bulky, so that they have not come into widespread use.

One of the objects of this invention is to provide a novel form of gas-filled electric discharge device suitable for use as a voltage breakdown device, that is simple and cheap to manufacture and may be constructed in a very robust form, and which can be designed so as to be used as a direct replacement for the solid type of breakdown device in many existing installations. Another object is to provide a simple and cheap method of manufacturing a gas-filled electric discharge device suitable for use as a voltage breakdown device. The method in accordance with the invention is, however, suitable for the manufacture of other electrical devices such as electric lamps, T-R cells and the like, and such other devices are included within the scope of this invention.

Hitherto in the manufacture of devices such as gas-filled voltage breakdown devices, electric lamps, T-R cells and the like, it has been customary to provide the envelope with a sealing stem through which the envelope can be evacuated and the required gas filling introduced, this stem being subsequently hermetically sealed. This has meant that each device must be individually connected to the pumping system, which is often inconvenient for mass production purposes; also after sealing off the device, the projecting tip of the stem, which is usually left, often constitutes a source of weakness of the envelope, as well as being unsightly. Moreover, with very small devices, it is often difficult to provide a suitable pumping stem.

An object of this invention is to provide a novel method of manufacturing such devices which does not require the use of a pumping stem.

According to the invention, in the manufacture of an electrical device of the kind referred to the envelope is constructed in the form of a number of alternate glass and metal parts which are loosely assembled within an enclosure so as to form the envelope with each metal part abutting against but not sealed to each adjacent glass part, the enclosure is filled to a suitable pressure with gas of the kind required for the filling of the device, so that the gas enters the interior of the assembly, and each said metal part is heated by eddy current heating so as to soften the glass of the adjacent glass part and seal thereto so as to effect the hermetic sealing of the assembly, the said suitable pressure of gas being such that the gas trapped within the envelope by the said sealing constitutes a filling at the required pressure when the device has cooled down to room temperature.

According to a particular aspect of the invention an electric discharge device suitable for use as a voltage breakdown device, and manufactured by the method in accordance with the invention, comprises an open-ended glass tube with intact imperforate side-walls closed at each end by the direct sealing thereto of an intact imperforate metal closure member, and which tube is filled with ionisable gas at sub-atmospheric pressure; the arrangement, including the internal and external spacing of the end closure members and the pressure of the gas filling, is such that the voltage difference between the closure members required to cause a discharge to pass between said members through the gas filling within the glass tube is less than the voltage which would be required to cause a discharge to pass between the members through air at normal atmospheric pressure outside the said tube.

It will be understood that in the foregoing statement the phrase "intact imperforate" in respect of the glass tube and metal closure members implies the absence of any sealed aperture (other than the ends of the tube) in the walls of the tube and the parts of the closure members which together constitute the envelope of the device.

For obtaining robustness of construction with such voltage breakdown devices, the length of the tube is preferably not more than twice its internal diameter, and with devices for use in apparatus operating on public supply mains at about 240 volts, the length of the glass tube is preferably less than one centimetre.

Preferably each metal closure member consists of a disc sealed on one side to an end face of the glass tube, and the central parts of one or both discs may in some cases be dished inwards so as to provide a suitable electrode spacing within the device. The metal closure members themselves act as the electrodes of a device in accordance with the invention and may in many cases also conveniently act simultaneously as the external terminals of the device.

Such an electric discharge device can, if required, be connected directly into an electric circuit arrangement so as to act by itself as a voltage breakdown device, but usually when such an electric discharge device is to be used as a voltage breakdown device, it will be preferable to fit it into an arrangement of conductors which surround the device so as to protect it and form a unit capable of being inserted in a holder provided in the circuit arrangement. The term "voltage breakdown device" is herein used to indicate the discharge device itself and an arrangement of the kind just referred to incorporating such a discharge device will be referred to as a voltage breakdown unit.

A voltage breakdown device in accordance with the invention as just described is suitable for use in arrangements where the normal voltage applied to the device is considerably less than the breakdown voltage required to cause a discharge to pass between said metal closure members through the gas filling within the tube; for example the latter voltage may be about 600 if the normal voltage is about 50. As aforesaid the breakdown voltage is in turn less, and usually much less, than the voltage required to cause a discharge to pass between the metal closure members through air at normal atmospheric pressure outside the envelope of the discharge device, which may be called the external breakdown voltage, and here "much less" means in general less than about one sixth; thus if the internal breakdown voltage is about 600, the external breakdown voltage will usually be not less than about 4000. However in some cases it may be desirable in a voltage breakdown device in accordance with the invention, as with known gas-filled electric discharge voltage breakdown devices, to arrange that the external breakdown voltage is not very much greater than the internal breakdown voltage, as a precautionary measure providing an air spark gap in parallel with the discharge path in case the discharge device should fail, and this may be effected by approaching parts of the metal closure members towards each other outside the envelope of the discharge device. Alternatively the same effect may be obtained in a voltage breakdown unit incorporating a discharge device in accordance with the invention, by providing a suitable air gap between a pair of conductors of the unit each connected to one of the metal closure members of the discharge device.

The method of manufacturing a gas-filled voltage breakdown device of the particular kind aforesaid comprises the steps of assembling an open-ended glass tube having intact imperforate side-walls with each end of the tube in abutment with an intact imperforate metal end closure member and heating the end closure members by eddy current heating to a temperature sufficient to soften the ends of the glass tube and effect the sealing of each end to the adjacent end closure member, the assembly being contained during the sealing in an atmosphere of gas required in the filling of the device, at such a pressure that after the sealing has been effected and the device cooled down to room temperature, the gas trapped within the sealed envelope formed by the glass tube and end closure members constitutes a filling at sub-atmospheric pressure.

The heating of the glass tube and metal end closure members may give rise during the sealing to an evolution of occluded gas some of which will also be trapped within the sealed device and form part of the final filling; often the presence of such traces of occluded gas can be tolerated, but in any case in which it would be disadvantageous, it can readily be avoided by giving the glass tube and metal end closure members a separate vacuum treatment at high temperature prior to the final sealing.

The metal of the end closure members should, of course, be suitably matched to the glass of the tube as regards thermal expansion coefficient for obtaining a reliable seal, and we have found it preferable to use a hard glass, that is to say a glass of relatively high silica content, for forming the tube.

It will be appreciated that the method in accordance with the invention avoids the necessity for a special pumping and filling of the envelope of the discharge device, thereby avoiding the need for a pumping stem and its sealing off and enabling a robust construction to be obtained. Also the method can readily be adapted for mass production of the devices since a plurality of assemblies may be contained within the same gas-filled enclosure and simultaneously or consecutively subjected to eddy current heating and sealing.

Figure 2:
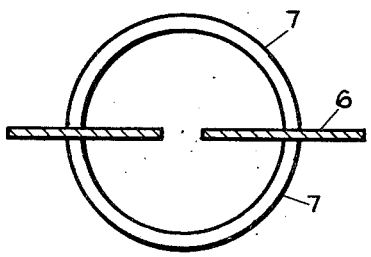
Figure 3:
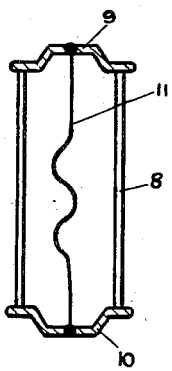
Figure 4:
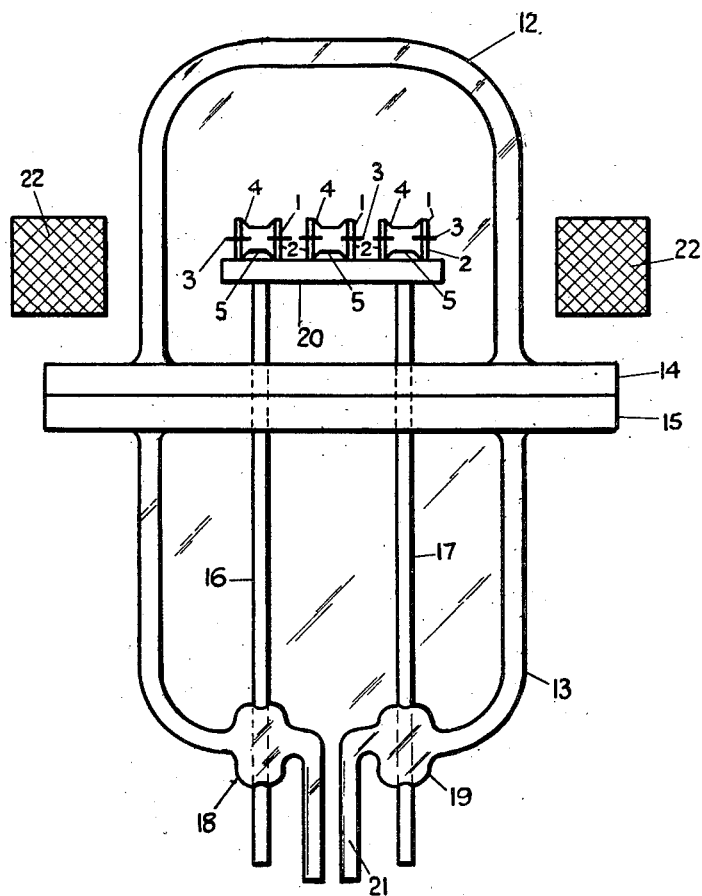
Figures 8, 9:
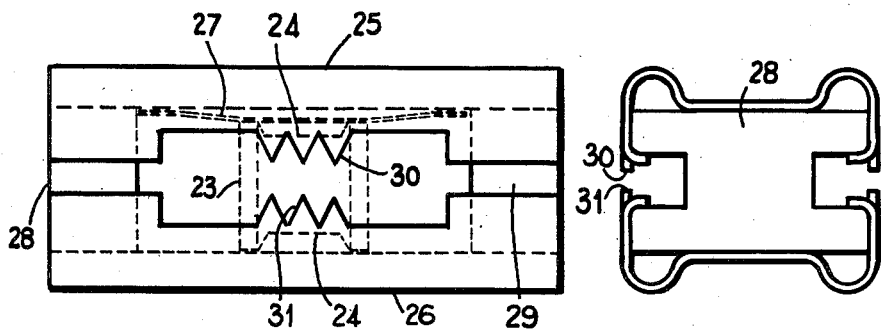
Figure 10:
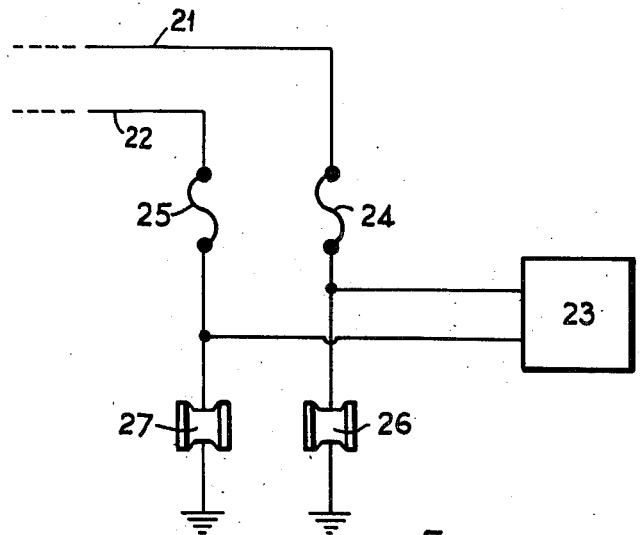

The invention will be further described with reference to the accompanying drawings in which Figures 1, 2 and 3 illustrate axial sections through some constructions of different forms of devices suitable for manufacture by the method in accordance with the invention, Figure 4 illustrates one form of apparatus suitable for use in carrying the invention into effect, Figure 5 shows a section containing the axis of a voltage breakdown device to whose manufacture the invention is particularly directed, Figure 6 shows an exploded view, in axial section, of the component parts of the device shown in Figure 5, prior to assembly, Figure 7 shows in side elevation the apparatus used for the manufacture of the discharge device shown in Figure 5, Figures 8 and 9 show respectively a side elevation and end elevation of a voltage breakdown unit incorporating an electric discharge device of the kind shown in Figure 5, and Figure 10 shows schematically a circuit arrangement incorporating two voltage breakdown devices of the kind shown in Figure 5.

Referring now to Figure 1, this illustrates one form of device which may be used as a voltage breakdown device for protecting telephone devices and the like against voltage surges. It consists of two glass rings 1, 2 abutting against opposite sides of a central annular metal disc 3 and each closed by a metal end disc 4 or 5 respectively. The interior of the device is filled with argon at a pressure of about 50 millimetres mercury.

Figure 2 illustrates a form of device known as a T–R cell and used in radio communication for preventing radio oscillations from a transmitter from passing to a receiver connected to a common aerial. It consists essentially of a thin annular disc 6 of metal, usually copper, to either side of which is sealed a substantially hemispherical glass shell 7 and the interior of which is filled with ionisable gas at subatmospheric pressure, usually argon at a pressure of about 700 millimetres mercury.

Figure 3 illustrates a form of filament device which may be a resistor, indicator lamp or fuse according to its exact nature. It consists of a glass tube 8 closed at each end by a metal end cap 9 or 10 and containing a wire filament 11 welded or otherwise attached at each end to one of the end caps. The device is filled with a gas, for example nitrogen, at a pressure appropriate to the function which the filament is required to perform.

Figure 4 of the accompanying drawing illustrates schematically a side view of apparatus arranged for sealing simultaneously a plurality of devices of the kind shown in Figure 1.

The apparatus shown in Figure 4 includes a hard glass enclosure divided into two parts 12 and 13 which are fitted together in vacuum tight manner by means of suitably greased opposed and ground flanges 14 and 15 respectively. The enclosure is supported from its lower part 13, by means not shown, so that the upper part 12 can be removed and replaced when required.

Two stout tungsten support wires 16 and 17 are sealed through the lower part 13 of the enclosure by means of seals 18 and 19, and the wires extend into the upper part 12 of the enclosure, where they support horizontally a ceramic platform 20.

The lower part 13 of the enclosure is continued by a stem 21 which can be put in communication alternatively with a vacuum pump or a source of filling gas, when required.

An eddy current heating coil 22 is arranged so that it can be fitted round the upper part 12 of the enclosure, when required, at the level of the platform 20.

In use of the apparatus, the upper part 12 of the enclosure is removed and a number of the assemblies to be sealed together, formed by stacking the metal discs and glass rings in position, are placed on the platform 20 with the glass rings 1 and 2 vertical, three such assemblies being shown in the drawing, although obviously the apparatus could be designed to handle many more.

The part 12 of the enclosure is then replaced and the stem 21 put into communication with a vacuum pump so as to exhaust the enclosure to a pressure of less than $10^{-4}$ millimetres of mercury.

The stem 21 is then put into communication with a source of argon and the enclosure filled with argon to a pressure of 50 millimetres of mercury. The coil 22 is then applied and the discs 3, 4, 5 of the assemblies heated to redness for about 30 seconds to effect their sealing to the glass rings 1 and 2.

The assemblies are then allowed to cool, the stem 21 opened to the atmosphere, and the part 12 of the enclosure removed for removal of the completed devices.

The apparatus may obviously be adapted to handle devices such as those shown in Figures 2 and 3 by providing suitable supporting means for enabling the assemblies to rest with their axes vertical, and in the case of a device of the kind shown in Figure 3, the filament 11 will be soldered to the end caps 9, 10 before inserting the device within the sealing enclosure, both of the caps being left loose.

If in any case it is required to degas the device before sealing, this can readily be arranged, for example by providing a baking treatment for the enclosure containing the devices whilst evacuated and before the sealing by eddy current heating.

It will be appreciated that other forms of devices than those illustrated in Figures 1, 2 and 3 can readily be manufactured by the method in accordance with the invention, and that this method is particularly suited to the sealing together of envelopes comprising a succession of parallel metal discs separated by glass rings, and provided with a gas filling at a required pressure. Such metal discs may be used, for example, as supports for internal electrodes in the case of an electric discharge device of this kind.

The manufacture of the particular form of voltage breakdown device with which the invention is especially concerned, and the construction of units and circuits incorporating this device, will now be particularly described with reference to Figures 5 to 10 of the drawings.

Referring now to Figure 5, the discharge device, which has rotational symmetry about its axis, comprises a central section in the form of a glass tube 23 of length 5 millimetres, internal diameter 4 millimetres, and wall thickness 1 millimetre; the glass is a borosilicate glass, and may be of the kind usually used for glass-to-metal seals in the envelopes of electric discharge devices. Both ends of the tube are open and the side-walls are imperforate. At each end the tube 23 is closed by a dished intact imperforate disc 24 of an iron-nickel-cobalt alloy suitably matched to the glass, which may be for example an alloy of the kind known under the trade name "Nicosel." Each disc is of diameter 6 millimetres and thickness 0.5 millimetre, and the inner peripheral surface of the disc is sealed to the end face of the tube 23. The dishing of the discs is such as to give a separation of 2 millimetres between the inner faces of the discs within the tube 23. The tube is filled with argon at a pressure of less than 100 millimetres of mercury, such as to give a breakdown voltage for the device of about 600 volts.

Figure 6 shows an exploded view of the components prior to sealing. Before use, the discs 24 are washed in carbon tetrachloride and then heated in wet hydrogen for 10 minutes at 1050° C.

The sealing is effected within the apparatus shown in Figure 7, which is the same as that described with reference to Figure 4, corresponding reference numerals denoting corresponding parts as in that figure.

In use of the apparatus, the upper part 12 of the enclosure is removed and a number of the assemblies (23, 24) to be sealed together are placed on the platform 20 with the glass tubes 23 vertical, three such assemblies being shown in the drawing, although obviously the apparatus could be designed to handle many more.

The part 12 of the enclosure is then replaced and the stem 21 put into communication with a vacuum pump so as to exhaust the enclosure to a pressure of less than $10^{-4}$ millimetres of mercury. If required, the eddy current heating coil 22 may then be applied and the assemblies 23, 24 given a preliminary heating for de-gassing, although this will often be unnecessary.

The stem 21 is then put into communication with a source of argon and filled with argon to a pressure of 100 millimetres of mercury. The coil 22 is then applied and the discs 24 of the assemblies heated to redness for about 30 seconds to effect their sealing to the glass tubes 23.

The assemblies are then allowed to cool, the stem 21 opened to the atmosphere, and the part 12 of the enclosure removed for removal of the completed discharge devices. It will be observed that in the sealing of the device the ends of the glass tube have been directly sealed to the discs, and that in the process the imperforate side-walls of the tube have been left intact, that is to say, no apertures have been provided therein which were subsequently sealed.

Electric discharge devices manufactured as described with reference to Figures 5, 6 and 7 are especially suitable for use in voltage breakdown units of the kind comprising a pair of parallel metal plate members between which the voltage breakdown device, hitherto usually of the solid type, is sandwiched in electrical connection therewith. Thus the plate members can be spaced from each other by one or more insulating members to which the plate members are attached, and at least one electric discharge device can be sandwiched between the plates with one end closure member in electrical contact with one plate member and the other end closure member in electrical contact with the other plate member.

Usually the plate members are elongated, and can conveniently be spaced apart by an insulating end block at each end, with the electric discharge device or devices positioned between the end blocks.

Figure 8 shows in side-elevation, and Figure 9 in end elevation, a discharge device of the kind shown in Figure 5 assembled into a voltage breakdown unit suitable for replacing directly the solid voltage breakdown devices often used in the fuse boxes of domestic telephone apparatus. These boxes usually include a pair of fuses clipped into spring holders and having in association with each fuse a spring socket into which is fitted a voltage breakdown unit incorporating a device which provides a path to earth for high voltage surges. Usually each of these spring sockets comprises a rigidly fixed metal guide member and facing metal leaf spring guide member which fits into channels formed in opposite sides of the voltage breakdown device unit and enables the latter to be slid into position between the members, the leaf spring member flexing about the end at which the unit is inserted and resiliently pressing the unit against the fixed guide member; the two guide members serve also as the electrical connection contacts for the device incorporated in the unit.

Referring now to Figures 8 and 9, the discharge device (23, 24) is shown fixed centrally between two channel-shaped metal plate members 25 and 26, with one disc 24 in contact with one member and the other disc 24 contacting the other member through a leaf spring 27 which holds the discharge device securely in position; the members 25 and 26 are rigidly held together by having tongues integral therewith folded round parts of insulating end blocks 28 and 29. The sides of the members 25 and 26 are formed with closely approaching opposed serrations 30, 31 which provide an auxiliary air spark gap in parallel with the discharge device.

It will be appreciated that the unit may readily be constructed with two discharge devices in parallel if required.

Figure 10 shows schematically a circuit arrangement incorporating such a fuse box fitted with two voltage breakdown units incorporating discharge devices in accordance with the invention.

We claim:

1. The method of manufacturing an electrical device having a sealed envelope whose interior is filled with gas to a required pressure and in which method the envelope is constructed in the form of a number of alternate glass and metal parts; said method including the steps of loosely assembling said glass and metal parts in alternate arrangement within an enclosure so as to form the envelope, arranging each metal and glass part to abut against, but not be sealed to, each adjacent glass and metal part, filling the enclosure to a suitable pressure with gas of the kind required for the filling of the device, so that the gas enters the interior of the assembly in the spaces between the loosely abutted parts, and then simultaneously heating all of the metal parts by eddy current heating so as to soften the glass of each glass part adjacent to a metal part and in one operation to effect the sealing together of all the glass and metal parts to form a hermetically closed envelope, the said suitable pressure of gas being such that the gas trapped within the envelope by the said sealing constitutes a filling at the required pressure when the device has cooled down to room temperature.

2. The method of manufacturing a gas-filled T-R cell whose envelope comprises a thin annular metal disc to either side of which is sealed a thin hemispherical glass shell, which method is carried out in accordance with claim 1 with said hemispherical glass shells abutting loosely against the metal disc prior to sealing to the disc by the eddy current heating of the disc.

3. The method of manufacturing a gas-filled voltage breakdown device whose envelope comprises two glass rings sealed to opposite sides of a central annular metal disc and each closed by a metal end disc, which method is carried out in accordance with claim 1 with said glass rings and metal discs loosely assembled prior to sealing together by the eddy current heating of the discs.

4. The method of manufacturing a filament device consisting of a glass tube closed at each end by a metal end cap, filled with gas at a required pressure, and containing a wire filament attached at each end to one of the end caps, which method is carried out in accordance with claim 1 with said glass tube and end caps, having said filament already attached thereto, loosely assembled prior to sealing together by the eddy current heating of said end caps.

5. The method of manufacturing an electric discharge device suitable for use as a voltage breakdown device, which comprises the steps of assembling within an enveloping container an open-ended glass tube having intact imperforate side-walls with each end edge of the tube in abutment with the face of an intact imperforate metal disc, filling said container with an ionisable gas at sub-atmospheric pressure, and heating said discs simultaneously by eddy current heating to soften the adjacent ends of the glass tube so as in one operation to effect the sealing of each end edge of the glass tube directly to the face of the abutting metal disc and thereby trap within the device a quantity of the said gas to provide the gas filling of the device whereby the structural strength of the discharge device is unimpaired by closure of an exhaust opening.

6. The method of manufacturing an electric discharge device suitable for use as a voltage breakdown device, which comprises the steps of assembling a glass tube with each end in abutment with a metal end closure member and heating the end closure members simultaneously by eddy current heating to a temperature sufficient to soften the ends of the glass tube and effect in one operation the sealing of each end to the adjacent end closure member, the assembly being contained during the sealing in an atmosphere of gas required in the filling of the device, at such pressure that after the sealing has been effected and the device cooled down to room temperature, the gas trapped within the sealed envelope formed by glass tube and end closure members constitutes a filling at the required pressure.

7. The method according to claim 6 wherein the end closure members consist of discs which are held in abutment with the end faces of the glass tube during the sealing.

References Cited in the file of this patent

UNITED STATES PATENTS

| 2,125,316 | Ronci | Aug. 2, 1938 |
| 2,152,998 | Kelting | Apr. 4, 1939 |
| 2,191,346 | Greiner | Feb. 20, 1940 |
| 2,259,165 | Karasick | Oct. 14, 1941 |
| 2,300,931 | Kalischer et al. | Nov. 3, 1942 |
| 2,427,086 | Arnott et al. | Sept. 6, 1947 |
| 2,449,676 | Seitz | Sept. 21, 1948 |
| 2,451,184 | Watrous | Oct. 12, 1948 |